United States Patent [19]
Ollivier

[11] Patent Number: 5,762,086
[45] Date of Patent: Jun. 9, 1998

[54] APPARATUS FOR DELIVERING PROCESS GAS FOR MAKING SEMICONDUCTORS AND METHOD OF USING SAME

[75] Inventor: Louis A. Ollivier, Palto Alto, Calif.

[73] Assignee: Veriflo Corporation, Richmond, Calif.

[21] Appl. No.: 575,021

[22] Filed: Dec. 19, 1995

[51] Int. Cl.$^6$ .............................. F16K 7/17; F16K 17/02
[52] U.S. Cl. .............. 137/1; 137/613; 137/489; 251/331
[58] Field of Search ............... 137/613, 1, 489; 251/333, 331

[56] References Cited

U.S. PATENT DOCUMENTS

| | | | |
|---|---|---|---|
| 4,026,513 | 5/1977 | Callenberg | 137/489 X |
| 4,044,794 | 8/1977 | Matthews | 137/613 |
| 4,828,219 | 5/1989 | Ohmi et al. | 251/331 X |
| 4,958,658 | 9/1990 | Zajac | 137/613 |
| 5,687,759 | 11/1997 | Tan | 137/489 X |

Primary Examiner—Kevin Lee
Attorney, Agent, or Firm—Antonelli, Terry, Stout & Kraus, LLP

[57] ABSTRACT

An apparatus free of polymer material in contact with process gas for delivering process gas for making semiconductors includes a pressure regulator for regulating the pressure of the process gas to be delivered by the apparatus from a supply of pressurized process gas. The pressure regulator has a first valve seat and a first valve which cooperates with the first valve seat for controlling the flow of process gas through the regulator. Both the first valve seat and the first valve are formed of metal. The apparatus further includes a second valve having metal-to-metal dynamic seating for controlling the flow of the gas from the supply to the regulator. The second valve is provided immediately upstream of the pressure regulator along a flow path for the gas through the apparatus. A relatively high creep of the pressure regulator is significantly reduced by operating the regulator in conjunction with the pneumatically operated (on/off) second valve.

23 Claims, 3 Drawing Sheets

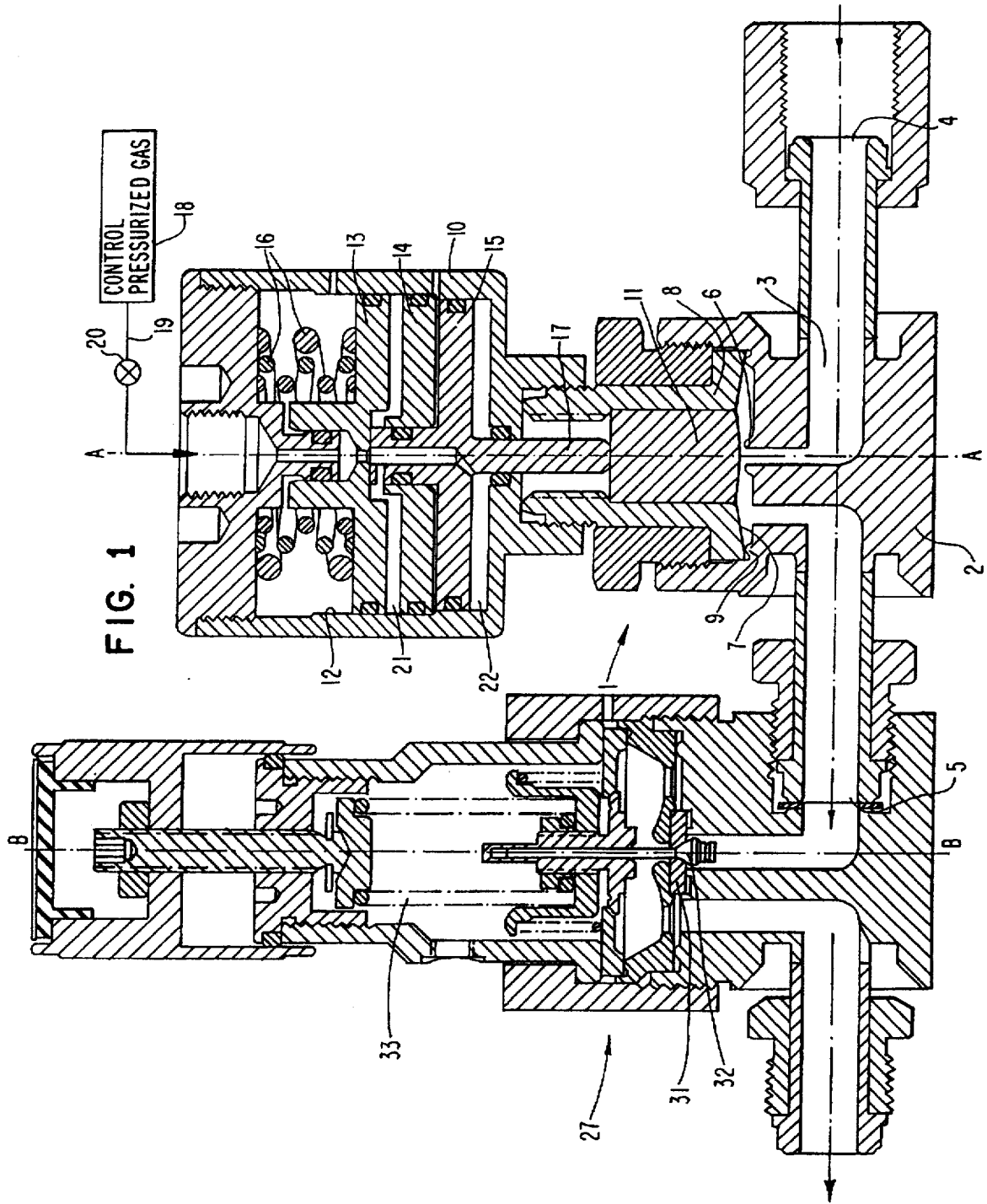

APPARATUS FOR DELIVERING PROCESS GAS FOR MAKING SEMICONDUCTORS AND METHOD OF USING SAME

RELATED APPLICATION

Applicant has filed concurrently with this application the commonly assigned application Ser. No. 08/575,022 filed Dec. 19, 1995, for VALVE HAVING METAL-TO-METAL DYNAMIC SEATING FOR CONTROLLING THE FLOW OF GAS FOR MAKING SEMICONDUCTORS, the disclosure of which is hereby incorporated by reference.

FIELD OF THE INVENTION

The present invention relates to an improved apparatus for delivering process gas for making semiconductors and a method of using the same.

BACKGROUND AND SUMMARY OF THE INVENTION

Semiconductor manufacturing involves the use of process gas which is delivered from a supply of the process gas to the manufacturing tool through a system or apparatus that includes tubing, valves and a pressure regulator, for example. Increased emphasis is being placed on preserving the integrity of the process gas as it travels through the delivery apparatus. Significant progress has been made by machining the surfaces in contact with the gas to a very fine finish, leaving out parts that could contribute to particulate contamination such as a bias spring within the pressure regulator, and cleaning the surfaces to insure a very low particle count, e.g. a small number of particles down to a size of 0.02 micron.

Valves and pressure regulators manufactured today for high purity applications typically use Kel-F type fluorocarbon polymers for seating. Such plastics adsorb moisture during valve and pressure regulator manufacture and release it slowly during their use in a dry gas system. Residual moisture levels required are currently less than 10 parts per billion. As feature widths in semiconductors become smaller, e.g. less than 0.5 micron, the requirement for drier systems becomes increasingly important.

An object of the present invention is to provide an improved apparatus for delivering process gas for making semiconductors and a method of using the same which overcome the aforementioned drawback of conventional apparatus and methods for these high purity applications. More particularly, an object of the present invention is to provide an improved high purity apparatus for delivering process gas for making semiconductors which makes it possible to use highly corrosion-resistant materials for the valves and regulator in the apparatus while maintaining acceptable performance including an acceptable creep value for the pressure regulator, and wherein adsorption of moisture inside the apparatus is greatly reduced by the total elimination of plastics or elastomers in contact with the gas being delivered by the apparatus.

A further object of the invention is to provide an improved method of supplying process gas for making semiconductors utilizing the apparatus of the invention having no plastics or elastomers in contact with the gas delivered and wherein the outlet pressure of the pressure regulator decreases when the regulator goes from a no flow state to a flow condition in accordance with a relatively smooth transition so as not to affect the operation of a mass flow controller of the apparatus located downstream of the pressure regulator along a flow path for the pressurized process gas through the apparatus.

These and other objects are attained by the improved apparatus for delivering process gas for making semiconductors and the method of using the same of the present invention. To this end, the apparatus of the invention for delivering process gas for making semiconductors comprises a pressure regulator for regulating the pressure of process gas to be delivered by the apparatus from a supply of pressurized process gas through the pressure regulator. The pressure regulator comprises a first valve seat and a first valve which cooperates with the first valve seat for controlling the flow of pressurized process gas through the pressure regulator. Both the first valve seat and the first valve are formed of metal.

The apparatus further includes in conjunction with the pressure regulator, a second valve having metal-to-metal dynamic seating for controlling the flow of pressurized process gas from the supply of pressurized gas to the pressure regulator. The second valve is located immediately upstream of the pressure regulator along a flow path for the process gas to the apparatus.

In the disclosed, preferred embodiment of the invention, the apparatus also comprises a mass flow controller for adjustably controlling the flow of pressurized gas delivered by the apparatus through the mass flow controller at an adjustable flow rate of from zero flow to a desired, set flow. The mass flow controller is located in the apparatus downstream of the pressure regulator along the flow path for pressurized process gas through the apparatus.

The pressure regulator, the second valve and the mass flow controller are arranged along the flow path such that the volume of pressurized process gas in the flow path between the first valve of the pressure regulator and the upstream second valve is relatively small as compared with the volume of pressurized gas in the flow path between the first valve of the pressure regulator and the downstream mass flow controller. As a result of this arrangement, even though the pressure regulator itself has a creep value which is considered excessive from a practical standpoint because of the metal-to-metal seat therein, a significant reduction of the creep value can be obtained by operating the pressure regulator in conjunction with the second valve mounted immediately upstream of the pressure regulator.

The increase in the outlet pressure of the pressure regulator when the flow through the apparatus is shut off is kept relatively small by insuring that the volume of pressurized process gas between the first valve of the pressure regulator and the second valve is relatively small as compared with the volume of the pressurized gas between the first valve of the pressure regulator and the mass flow controller. As a result, when the flow of pressurized process gas through the apparatus is resumed, a transition from the increased outlet pressure of the regulator to the set outlet pressure of the regulator can take place without affecting the operation of the flow controller.

The disclosed, preferred embodiment of the apparatus of the invention further comprises a third valve having metal-to-metal dynamic seating for controlling the flow of pressurized process gas from the mass flow controller in that the third valve is located downstream of the mass flow controller along the flow path for the pressurized process gas through the apparatus. Means are provided for opening the second valve at the same time the mass flow controller is set at a desired flow after having been set at zero flow, and for closing the second valve at the same time the mass flow controller is set at zero flow for stopping flow of pressurized process gas through the apparatus.

The apparatus eliminates the use of plastic valve seats in the valves and regulator of the apparatus so that no plastic or elastomer contacts the pressurized process gas flowing through the apparatus. Therefore, adsorption of moisture inside the apparatus is greatly reduced in comparison with conventional apparatus for delivering process gas for making semiconductors. This advantage is attained while the combination of the pressure regulator and the second valve, which is operated in conjunction with the mass flow controller as referred to above, make a tight seal at zero flow with a minimum change in outlet pressure.

The metal first valve seat of the pressure regulator, in a forming phase, is stressed by a force supplied thereto by the metal first valve of the regulator. The stress exceeds the yield stress of the metal such that any irregularity in the first valve seat on the order of 0.001 inch or smaller in size is reshaped to give a continuous line of contact between the first valve seat and the first valve when there is no flow of pressurized process gas through the apparatus.

The second valve of the apparatus includes a second metal seat having a gas passage therethrough for the flow of pressurized gas through the second valve and a metal member in the form of a flexible metal diaphragm which cooperates with the second metal seat for opening and closing the gas passage as the diaphragm moves into and out of sealing contact with the seat. An actuator of the second valve is operable for opening and closing the gas passage by moving the diaphragm relative to the second metal seat.

The actuator includes a metal backing member which contacts the metal diaphragm on a side of the diaphragm opposite the side thereof which makes sealing contact with the second metal seat. The metal backing member is moved in response to operation of the actuator between a valve open position and a valve closed position where the metal backing member transmits a force from the actuator pressing the diaphragm against the second metal seat for closing the gas passage.

The performance demanded of the second valve in the apparatus for supplying high purity gas for making semiconductors is for near absolute closure, e.g. a leakage rate of less than $1 \times 10^{-8}$ SCC/sec (standard cubic centimeters per second). It is problematical to attain such performance using metal-to-metal seated valves, particularly where relatively low forces are available for providing the reliable pressure control in the valve, as is the case with relatively small, instrument valves like those of the present invention for use in supplying high purity gas for making semiconductors.

This problem is overcome by the second valve of the present invention which has metal-to-metal dynamic seating for controlling the flow of gas in that the metal seat and the metal backing member are configured such that the sealing contact between the diaphragm and the metal seat is a relatively narrow, continuous line of contact extending about the gas passage. This is achieved in that the metal seat is in the form of a rounded, metal sealing projection extending about the gas passage, the sealing projection having a relatively small radius of curvature around the seating cross section of the seat, and each of the metal diaphragm and the metal backing member is formed of a relatively hard metal for proper transfer of sealing pressure from the actuator to the diaphragm and seat.

As a result of these features of the invention, stress which is needed to force the hard diaphragm into intimate sealing contact with the softer metallic seat can be generated so as to make a near absolute closure or seal. Further, the pressure generated during valve closing will stress the softer seat sufficiently to flatten any asperities or geometrical errors in machining of the seat on the order of 0.001 inch or smaller since the stress on these exceeds the yield strength of the seat material and thereby reshapes the seat to give the aforementioned relatively narrow (0.002 inch wide, for example), continuous line of contact between the diaphragm and the seat. In that formed condition, a tight seal can be obtained with the relatively low actuator force available in the relatively small instrument valve.

These and other objects, features and advantages of the present invention will become more apparent from the following detailed description of a disclosed, preferred embodiment of the invention taken with the accompanying drawings, which illustrate the embodiment.

BRIEF DESCRIPTION OF THE DRAWINGS

FIG. 1 is a cross sectional view through a combination of a pressure regulator and a pneumatic valve of an apparatus for delivering process gas for making semiconductors according to the invention, taken along the longitudinal central axis of a gas passage through the apparatus, and schematically depicting a control arrangement for operating the pneumatic valve of the apparatus;

DETAILED DESCRIPTION OF THE DISCLOSED EMBODIMENT

Figure 3:
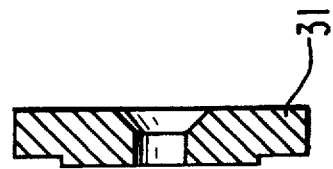
FIG. 3 is a cross sectional view of the metal valve seat of FIG. 2 taken along the line III—III.
Figure 2:
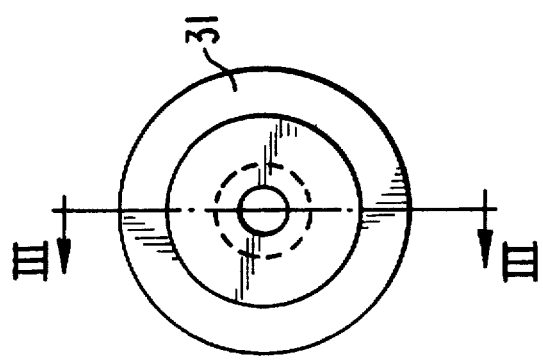
FIG. 2 is an elevational view of the metal valve seat of the pressure regulator of the apparatus of FIG. 1 taken in the direction of the longitudinal central axis B—B of the valve seat as shown in FIG. 3.
Figure 4:
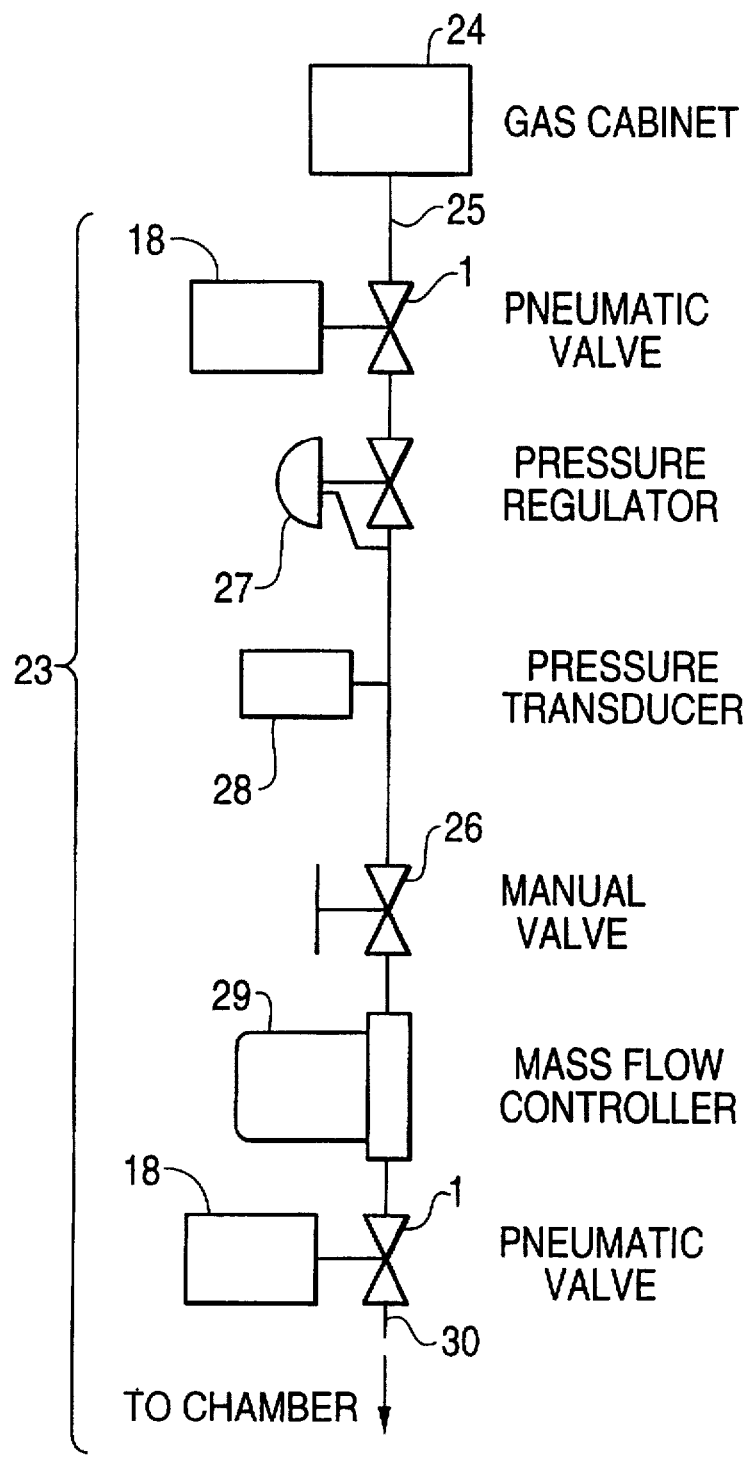
FIG. 4 is a schematic illustration of the apparatus of the invention, including the combination of FIG. 1, and additional components for supplying high purity gas for making semiconductors.

Referring now to the drawings, an apparatus 23 for delivering high purity process gas for making semiconductors is shown schematically in FIG. 4. The apparatus 23 comprises the combination of a pressure regulator 27 and a pneumatic valve 1 constructed according to the present invention as depicted in detail in FIG. 1 of the drawings. The valve 1 and pressure regulator 27 are located at an upstream end of a gas line 25 of the apparatus 23. In addition, a pressure transducer 28, a manual valve 26, a mass flow controller 29 and another valve 1, like that in FIG. 1, are arranged successively downstream of the pressure regulator 27, before an outlet 30 of the apparatus.

The apparatus 23 is formed of materials which are selected so that no plastic or elastomer contacts the pressurized process gas flowing through the apparatus. In the pressure regulator 27, the valve seat 31 is not the conventional Kel-F fluorocarbon polymer but instead is a metal seat which is used in combination with a metal valve 32 for controlling the flow of pressurized process gas through the pressure regulator.

A main design concern in the construction of the pressure regulator of the invention relates to the ability of the pressure regulator to make a tight seal at the valve seat assembly at zero flow with a minimum change in outlet pressure. In a conventional pressure regulator this is obtained by making the seat with a polymer material as noted above. Such a polymer material has excellent corrosion resistance and good physical properties, e.g. a yield strength of up to 4,000 psi at 140° F., for example. It is practical in the conventional pressure regulator to design the seat which will cooperate with the valve (poppet), to create a continuous line of contact for a tight seal with an applied force of only 2 to 3 pounds. On the other hand, in the pressure regulator 27 of the present invention, the seat is made of metal, 316L stainless steel in the disclosed embodiment, having a yield strength which is at least ten times that of the fluorocarbon polymer material used for the seat in a conventional pressure regulator. In order to obtain the same condition of sealing using the metal seat of the present invention requires a much higher force, e.g. 20 to 30 pounds. In order to avoid the need for such a high force, according to the present invention the valve seat 31 of the pressure regulator 27 of the invention is shaped so that the effective sealing force is reduced to a range of 10 to 15 pounds.

This is accomplished by setting the outlet pressure of the regulator to 50 psi at zero flow, than backing the adjusting spring 33 of the regulator to a zero setting. This creates a condition in which the valve 32 is pulled against the seat 31 with a nominal force of 50 pounds, assuming the effective area of the diaphragm is one square inch. A line of contact 0.002 inch wide on a 0.080 orifice defines an area subjected to a stress of 99,000 psi under the application of this force. Therefore, any irregularity in the machining of the seat 31 on the order of 0.001 inch or smaller will be subjected to a stress exceeding the yield strength of the metal seat and, as a result, the seat will be reshaped to give a continuous line of contact. In the formed condition, a tight seal can be obtained between the valve 32 and valve seat 31 with a smaller force. Typically a force of 10 to 15 pounds will create by compression within the elastic range, a continuous line of contact sufficient to effect a tight seal.

The creep or creep value of a pressure regulator is the change in outlet pressure of the regulator as the flow through the regulator goes from higher flow, such as 100 cc/min, to low or no flow. A pressure regulator 27 according to the invention was found to have a creep of 10 to 15 psi. From a practical standpoint, this is excessive. However, according to a further feature of the present invention, a significant reduction of the creep value of the pressure regulator can be obtained by operating the pressure regulator 27 in conjunction with the valve 1 according to the invention which is mounted immediately upstream of the regulator.

The valve 1 is actuated at the same time as the downstream mass flow controller 29 so that as the flow is shut off at controller 29, the inlet valve 1 immediately upstream of the pressure regulator 27 is also shut off. Since the metal-to-metal seal of the regulator does not make a perfectly tight seal in this zero flow condition, the outlet pressure $p_o$ of the regulator will increase slowly and at the same time, there will be a corresponding decrease of the inlet pressure $p_i$ to the pressure regulator from the pressurized gas between the regulator and the valve 1. Ultimately, the pressures at the inlet and the outlet of the pressure regulator 27 equalize at a value higher than $p_o$ and lower than $p_i$. The increase in pressure d $p_o$ is a function of the initial pressure difference $(p_i-p_o)$ upon shutting off the flow, the volume v at the inlet and the volume V at the outlet according to the equation:

$$dP_o = (P_i - P_o) \times \frac{1}{1+\frac{V}{v}}$$

For example, with $p_i-p_o=15$ psi, V=12 mL and v=3 mL, d $p_o=15\times\frac{1}{5}=3$ psi. Note that as the flow is shut off, the rate of increase $p_o$ will become smaller as $p_o$ approaches its final value. It may take 30 seconds to increase by 1 psi, 3 minutes to increase by 2 psi and 30 minutes to increase by 3 psi.

An initiation of the flow involves actuating the mass flow controller 29 to deliver the desired flow and at the same time opening the inlet valve 1 upstream of the pressure regulator 27. Supply pressure $p_i$ is then applied to the inlet of the pressure regulator 27. The outlet pressure $p_o$ starts to decrease as soon as there is flow and until its value corresponds to the setting of the pressure regulator. The time it takes to reach that value is a function of the flow and volume V. A change of 3 psi, from 18 to 15 psi corresponds to a volume of 3/15×V or 2.4 mL. At a flow rate of 100 mL/min the time will be (2.4/100)×60=1.4 sec. This transition of $p_o$ from 18 to 15 psi will not affect the operation of the mass flow controller 29 as long as it is smooth.

The valve 1 having metal-to-metal dynamic (on/off) seating for controlling the flow of gas is depicted in detail in FIG. 1 and is also disclosed in the aforementioned concurrently filed, commonly assigned application Ser. No. 08/575,022, filed Dec. 19, 1995. As indicated in FIG. 1, the valve 1 comprises a valve body 2 having a gas passage 3 extending therethrough for the flow of gas from an inlet 4 to an outlet 5 of the valve which is connected with pressure regulator 27. A metal seat 6 in the form of a rounded, metal sealing projection extends angularly about the gas passage 3. The seat 6 is in the form of a toroid in the disclosed embodiment.

A flexible metal diaphragm 7 is mounted in the valve 1 so that the diaphragm can be moved into and out of sealing contact with the metal seat 6 to respectively close and open the gas passage 3. A radially outer portion of the diaphragm is statically sealed against the valve body 2 by a clamping member 8 forcing the diaphragm 7 against a toroidal-shaped projection 9 on the valve body. When so mounted in the valve, the diaphragm has a radially inner portion thereof which is adapted to move, with flexing of the diaphragm, to and from the metal valve seat 6 for closing and opening the gas passage therethrough. This movement of the diaphragm is caused by the movement of an actuator 10 of the valve in conjunction with the gas pressure on the diaphragm as discussed below.

The actuator 10 is operable for opening and closing the gas passage 3 by way of movement of the diaphragm relative to the metal sealing projection of the seat 6. In particular, the actuator transfers a sealing force to the metal seat 6 by way of diaphragm 7 in the off or closed mode of the valve and actuator. The actuator includes a metal backing member 11 in the form of a piston contacting the diaphragm 7 on a side of the diaphragm opposite a side thereof which makes sealing contact with the metal seat 6. In the disclosed embodiment, the actuator further comprises a cylinder 12 and pistons 13, 14 and 15 slidably arranged in the cylinder. An assembly of springs 16 yieldably biases the piston 13 in a downward direction, toward the valve seat 6, for closing the gas passage. The downward closing force is 100 to 120 pounds.

The closing force of the springs 16 on piston 13 is transmitted downwardly to the flexible metal diaphragm 7 by way of piston 15 and its piston rod 17. The lower end of the piston rod 17 abuts against the upper end of metal backing member 11. The metal backing member is in the form of a piston which is slidably arranged within the clamping member 8 for movement along the axis A—A of the actuator toward and away from the valve seat 6. The lower end of the piston 11 is convex, with a radius of curvature of one inch in the illustrated embodiment. Alternatively, the lower end of the metal backing member 11 could be in the form of a ball. These shapes and the hardness of the piston are effective to back up the hard flexible diaphragm for transmitting the closing force so as to form a narrow, continuous line of sealing contact between the sealing projection of the seat and the diaphragm.

The diaphragm used in the instrument valve 1 is typically very thin, in the range of 0.002 to 0.004 inch thick, for example, making it necessary to back up the thin flexible metal diaphragm 7 in the valve 1 with the metal backing member 11, shaped to the diaphragm's curvature where the diaphragm is contacting the seat. Research by the inventor has shown that with the limited actuator force possible in the relatively small, instrument valve 1 according to the invention, for effecting valve closing, a near absolute closure (leakage rate less than $1 \times 10^{-8}$ SCC/sec), in effect a leak-proof seal, can be obtained where the toroidal sealing projection 6 is formed of a relatively soft metal, Rockwell B65 to B100, and has a very small radius, 0.005–0.020 inch around the seating cross-section of the toroid. The diaphragm 7 which presses on the relatively soft metal seat 6 must be hard, typically Rockwell C50 or greater, preferably C60 to C70. Compressive strengths of the respective metals of the metal seat 6 and the diaphragm are generally proportional to their hardness.

An analysis of the stresses needed to force the hard diaphragm into intimate contact with the softer metallic seat shows that pressures of 100,000 psi or more will not only make a leak-proof seal, but will stress the softer seat sufficiently to flatten any asperities or geometrical errors in the seat, as from machining on the order of 0.001 inch or smaller in size. A transfer of pressure from the diaphragm to the seat of this magnitude can only be achieved with the use of a hard metal backing member 11. If the metal backing member is softer, in the range of Rockwell B50 to C25 or so, the sealing pressure from the actuator 10 will not be transmitted properly through the diaphragm to the seat. Since the diaphragm 7 can only move in and out from the reformed seat, and is constrained against any rotation by the outer static seal of the diaphragm to the valve body, the seat so formed remains intact for the life of the valve.

In the disclosed embodiment, the valve body and seat are formed of 316L stainless steel with the seat being relatively soft, having a hardness of Rockwell B65 to B100, as noted above. The compressive yield strength of the valve body and seat is typically 80,000 psi. The hard or hardened metal backing plate 11 is formed of a hardened stainless steel, e.g. 17-4PH with a hardness greater than Rockwell C25, preferably C40 to 60. The compressive yield strength of the piston 11 is 200,000 psi. The metal of the diaphragm in the disclosed embodiment is Elgiloy which has been work hardened to have a hardness of Rockwell C50 or greater, preferably C60 to C70. The diaphragm has a compressive yield strength of 250,000 psi. However, other metals can be employed for the seat 6, diaphragm 7 and backing member 11 provided the aforementioned basic relationship of a relatively soft toroid for the seat, a hard (high compressive strength) diaphragm and a hard metal backing member properly contoured, is used.

A supply 18 of pressurized gas is conveyed by gas line 19 under the control of a solenoid valve 20 to the actuator 10 for controlling the operation of the valve 1 as depicted in FIG. 1. Absent application of the control pressurized gas via line 19 to the chambers 21 and 22 of the actuator by operation of the solenoid valve 20 to open the valve, the springs 16 downwardly bias the metal backing member 11 with a sealing force of between 100 and 120 pounds, so that the diaphragm 7 of the valve is pressed against the metal seat 6 to sealingly contact the seat to close the gas passage 3 through the valve. Application of the control pressure, 60 to 80 psi, for example, to the actuator 10 by opening of the solenoid valve 20 introduces the pressurized control gas to the chambers 21 and 22, depressing the springs 16 to move the pistons 13, 14 and 15 upwardly within the actuator. The piston rod 17 of the piston 15 is thus moved upwardly permitting the piston 11 backing-up the diaphragm to be moved upwardly in response to the gas pressure in the gas passage 3 in the valve. This opens the gas passage to the "on" or open position of the valve.

By way of example, a valve 1 constructed according to the present invention can be installed at a point of use in an apparatus 23 for delivering high purity process gas for making semiconductors as shown schematically in FIG. 4. A typical inlet pressure of process gas from gas cabinet 24 to the apparatus 23 and valve 1 thereof by gas line 25 is 30 psi, and the maximum flow is two liters per minute. A valve seat 6 with a 0.062 inch orifice in the valve 1 will meet such a requirement. The diaphragm of the valve 1 makes a line of contact 0.002 inch wide with the toroid projection of the seat on a diameter of 0.080 inch. A force of 50 pounds applied by the actuator 10 to the line of contact 0.002 inch wide creates a stress of 99,000 psi. Any irregularity in the machining of the relatively soft metal seat on the order of 0.001 inch or smaller is size will be subjected to stress exceeding the yield strength and, as a result, reshaped to give a continuous line of contact between the seat and the diaphragm during the "off" or closed state of the valve. In that formed condition, a tight seal can be obtained with the seat using the relatively small closing force available from the actuator 10.

Tests showed that the valve 1 constructed according to the present invention, with a valve seat orifice of 0.062 inch is referred to above and with a 0.010 inch radius of curvature for the toroid sealing projection 6, resulted in an in-line sealing, e.g. the leakage rate across the valve seat was less than $10^{-8}$ cc per second with 30 psi gas pressure at the inlet. The quality of sealing with the valve 1 was maintained after 500,000 cycles. The pressure drop across the valve at a flow of 5 liters per minute was less than 0.25 psi with a 10 psi differential pressure.

The flexible metal diaphragm 7 in the disclosed embodiment is illustrated as a single, thin metal layer, of Elgiloy, but a laminate of several such layers could be used as the diaphragm. The valve 1 depicted in FIG. 1 is a pneumatic valve, operated by pressurized gas from supply 18 as noted above through actuation of solenoid valve 20, FIG. 1. However, the valve according to the invention can be a manually actuated valve. In such case, a preset spring would be incorporated into the stem of the valve to create the sealing force which would be manually turned "on" or "off" for attaining the metal-to-metal dynamic seating for controlling the flow of gas. Such a manual valve is schematically depicted at 26 in the apparatus 23 in FIG. 4.

As noted above, the apparatus 23 in FIG. 4 comprises two pneumatic valves 1, 1 according to FIG. 1, at respective ends of the gas line 25 with the manual valve 26 being located intermediate the two. The pressure regulator 27 is employed in combination with the upstream one of the valves 1,1 as shown in FIG. 1. The apparatus 23 further includes a pressure transducer 28 and a mass flow controller 29 with these and the other components being located in the gas line 25 upstream of an outlet 30 of the apparatus.

Operation of the apparatus 23 employing the valve-regulator combination and valves according to the present invention for delivering pressurized process gas from gas cabinet 24 to a chamber for making semiconductor devices comprises: prior to start of an active phase pneumatic valves 1, 1 are closed, manual valve 26 is open and mass flow controller 29 is set to zero; at the start of the active phase the pneumatic valves 1,1 are opened and the mass flow controller 29 is set to the desired flow; and at the end of the active phase the pneumatic valves 1,1 are closed and the mass flow controller is set to zero. At all times during this operation the pressure regulator remains set at the desired regulated pressure. Through the use of the improved pressure regulator 27 and the valves 1,1 and 26 of the present invention having metal-to-metal seating without the use of plastics or elastomers in contact with the gas, moisture adsorbed and released in the dry gas system can be reduced as compared with an apparatus employing conventional valves and a conventional pressure regulator using Kel-f fluorocarbon polymers for seating.

While I have shown and described only one embodiment in accordance with the present invention, the invention is not limited to the details thereof as shown and described herein but is susceptible to the numerous variations as will be readily understood by the skilled artisan without departing from the spirit of the invention or the scope of the following claims.

I claim:

1. A method of supplying process gas for making semiconductors, said method comprising providing an apparatus for delivering process gas for making semiconductors, said apparatus comprising a pressure regulator for regulating the pressure of process gas to be delivered by said apparatus from a supply of pressurized process gas through said pressure regulator, said pressure regulator comprising a first valve seat and a first valve which cooperates with said first valve seat for controlling the flow of pressurized process gas through said pressure regulator, both said first valve seat and said first valve being formed of metal, a second valve having metal-to-metal dynamic seating for opening and closing a gas passage through said second valve for controlling the flow of pressurized process gas from said supply of pressurized process gas through said gas passage of said valve to said pressure regulator, fluid passage means connecting said second valve and said pressure regulator for gas tightly flowing said process gas therebetween with said second valve being located immediately upstream of said pressure regulator along a flow path for said pressurized process gas through said apparatus, a mass flow controller for adjustably controlling the flow of pressurized gas delivered by said apparatus through said mass flow controller from zero flow to a desired, set flow, said mass flow controller being located in said apparatus downstream of said pressure regulator along said flow path for pressurized process gas through said apparatus, said method further including, for supplying process gas for making semiconductors utilizing said apparatus, opening said second valve and setting said mass flow controller at a desired flow at the same time, and for stopping supplying process gas closing said second valve and setting said mass flow controller at a zero flow setting at the same time.

2. The method according to claim 1, including arranging said second valve and said mass flow controller along said flow path such that the volume of pressurized gas between said first valve of said pressure regulator and said second valve is relatively small as compared with the volume of pressurized gas between said first valve of said pressure regulator and said mass flow controller whereby a creep value of said pressure regulator can be significantly reduced.

3. An apparatus for delivering high purity process gas for making semiconductors while maintaining an acceptable creep value for pressure regulator of the apparatus, said apparatus comprising:

a pressure regulator for regulating the pressure of process gas to be delivered by said apparatus from a supply of pressurized process gas through said pressure regulator, said pressure regulator comprising a first valve seat and a first valve which cooperates with said first valve seat for controlling the flow of pressurized process gas through said pressure regulator, both said first valve seat and said first valve being formed of metal and said pressure regulator itself having a creep value which is considered excessive from a practical standpoint;

a second valve having metal-to-metal dynamic seating for opening and closing a gas passage through said second valve for controlling the flow of pressurized process gas from said supply of pressurized process gas through said gas passage of said second valve to said pressure regulator, said second valve when closing said gas passage effecting a near absolute closure with a leakage rate less than $1 \times 10^{-8}$ SCC/sec;

fluid passage means connecting said second valve and said pressure regulator for gas tightly flowing said process gas therebetween with said second valve being located immediately upstream of said pressure regulator along a flow path for said pressurized process gas through said apparatus; and means downstream of said pressure regulator along said flow path for shutting off the flow of process gas delivered by said apparatus, wherein the materials of said apparatus are selected so that no plastic or elastomer contacts said pressurized process gas flowing through said apparatus, and wherein the volume of pressurized process gas between said first valve of said pressure regulator and said second valve is relatively small as compared with the volume of pressurized gas between said first valve of said pressure regulator and said means downstream of said pressure regulator along said flow path for shutting off the flow of process gas delivered by said apparatus whereby a significant reduction of the creep value of the pressure regulator can be obtained by closing said second valve at the same time said means downstream of said pressure regulator shuts off the flow of the process gas delivered by said apparatus.

4. The apparatus according to claim 3, wherein said means for shutting off the flow includes a mass flow controller for adjustably controlling the flow of pressurized gas delivered by said apparatus through said mass flow controller from zero flow to a desired, set flow.

5. The apparatus according to claim 4, wherein said means for shutting off the flow further includes a third valve having metal-to-metal dynamic seating for controlling the flow of pressurized process gas from said mass flow controller, said third valve being located downstream of said mass flow controller along said flow path for said pressurized process gas through said apparatus.

6. The apparatus according to claim 4, further comprising means for opening said second valve at the same time said mass flow controller is set at a desired flow and for closing said second valve at the same time said mass flow controller is set at zero flow.

7. The apparatus according to claim 3, wherein said metal first valve seat of said pressure regulator is of a particular type of metal and relative hardness with respect to said first valve such that said first valve seat has been stressed by a force applied thereto by said metal first valve which exceeds the yield stress in any irregularity in the first valve seat on the order of 0.001 inch or smaller in size to reshape the seat to give a continuous line of contact between the first valve seat and the first valve when there is no flow of pressurized process gas through said apparatus.

8. The apparatus according to claim 3, wherein said second valve includes a second metal seat having said gas passage therethrough for the flow of pressurized gas through said second valve and a metal member which cooperates with said second metal seat for opening and closing said gas passage.

9. The apparatus according to claim 8, wherein said metal member is a flexible metal diaphragm mounted in said second valve so that said diaphragm can be moved into and out of sealing contact with said second metal seat to respectively close and open said gas passage, and said second valve further including an actuator operable for opening and closing said gas passage by way of movement of said diaphragm relative to said second metal seat.

10. The apparatus according to claim 9, wherein said actuator includes a metal backing member which contacts said metal diaphragm on a side of said diaphragm opposite a side thereof which makes said sealing contact with said second metal seat, said metal backing member being movable in response to operation of said actuator between a valve open position and a valve closed position where the metal backing member transmits a force from said actuator to said diaphragm and said second metal seat for closing said gas passage.

11. The apparatus according to claim 10, wherein said second metal seat is formed of a relatively soft metal and each of said metal diaphragm and said metal backing member is formed of a relatively hard metal.

12. The apparatus according to claim 10, wherein said second metal seat and said metal backing member are configured such that said sealing contact between said metal diaphragm and said second metal seat is a relatively narrow line of contact extending about said gas passage.

13. The apparatus according to claim 12, wherein said second metal seat is in the form of a rounded metal sealing projection extending about said gas passage.

14. The apparatus according to claim 13, wherein said rounded metal sealing projection is formed integrally with a valve body of said second valve.

15. The apparatus according to claim 13, wherein said rounded metal sealing projection has a hardness of Rockwell B65 to B100.

16. The apparatus according to claim 13, wherein said flexible metal diaphragm has a hardness of Rockwell C50 or greater.

17. The apparatus according to claim 13, wherein said metal backing member has a hardness greater than Rockwell C25.

18. The apparatus according to claim 13, wherein said metal backing member has a contour which is convexly rounded at a surface thereof which contacts said diaphragm.

19. The apparatus according to claim 13, wherein said metal sealing projection of said second metal seat is toroidal.

20. The apparatus according to claim 19, wherein said toroidal sealing projection has a radius of curvature of 0.005–0.020 inch as seen in a cross section taken along a longitudinal central axis of said toroidal sealing projection.

21. The apparatus according to claim 10, wherein said actuator forces said metal diaphragm against said metal sealing projection of said second metal seat by way of said metal backing member with a force of between 50 and 150 pounds when said gas passage is closed by said actuator.

22. The apparatus according to claim 21, wherein said actuator includes a cylinder and at least one piston slidably arranged in said cylinder, spring means for yieldably biasing said at least one piston in a direction for closing said gas passage with said force of between 50 and 150 pounds, means for introducing a pressurized fluid for moving said at least one piston against said biasing force of said spring means for opening said gas passage and a piston rod for transmitting said closing force from said at least one piston to said metal backing member.

23. The apparatus according to claim 10, wherein said metal backing member is in the form of a piston which is slidably arranged in said second valve for movement toward and away from said metal sealing projection as a result of forces on said piston from said actuator and gas pressure in said second valve acting on said diaphragm.

\* \* \* \* \*